Jan. 16, 1945. J. W. RUSH 2,367,618
CONTROL VALVE DEVICE
Filed Sept. 29, 1943 2 Sheets-Sheet 2
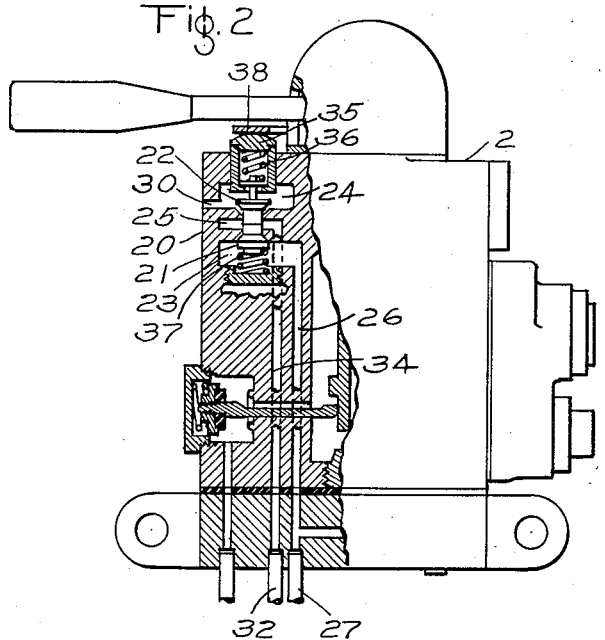
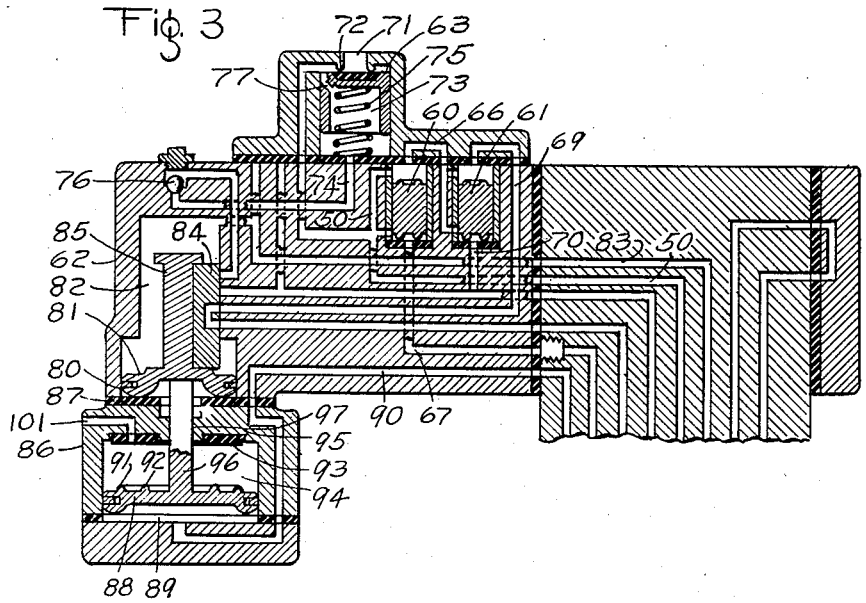
INVENTOR
JOHN W. RUSH
BY
ATTORNEY Patented Jan. 16, 1945

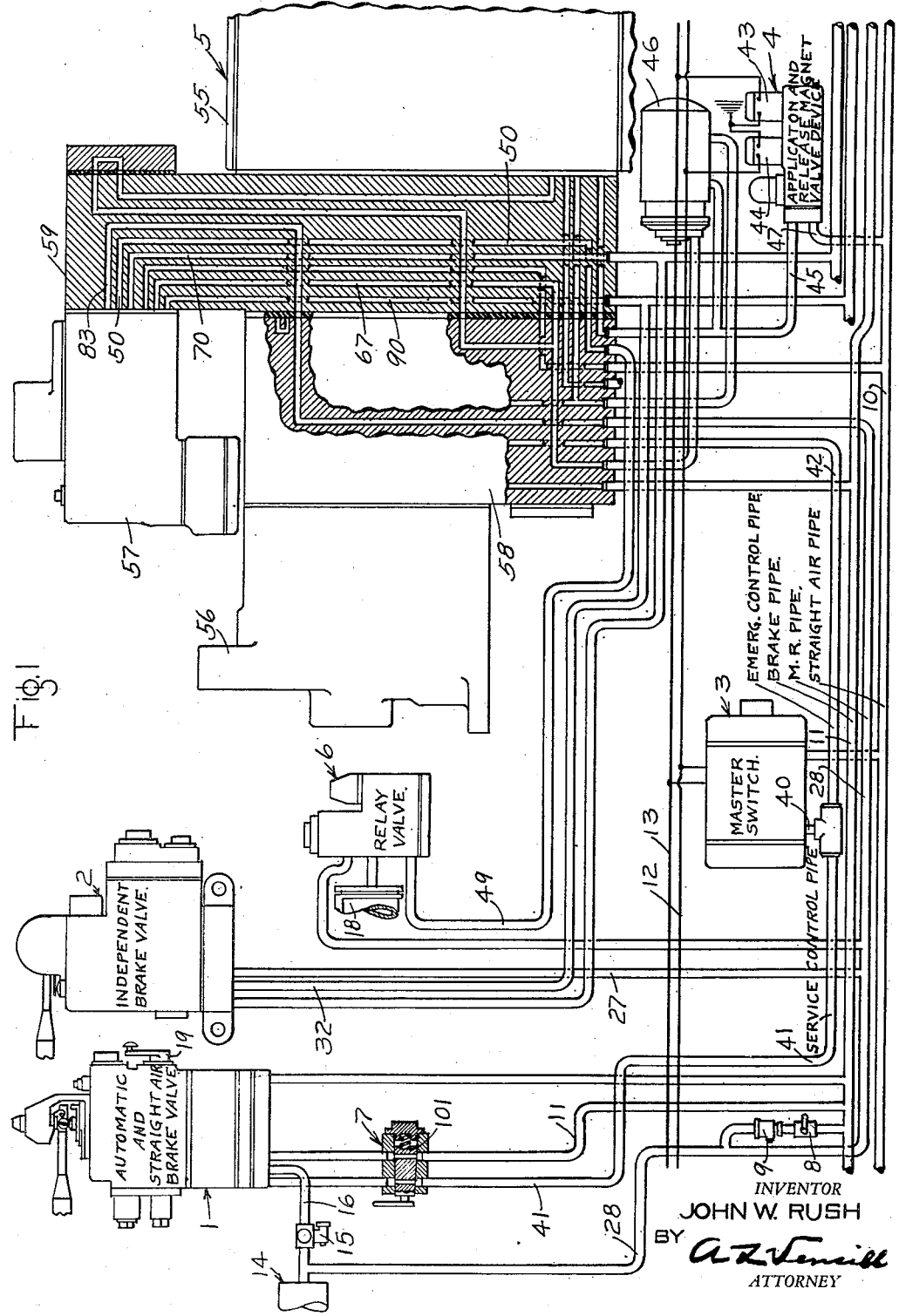

2,367,618

UNITED STATES PATENT OFFICE 2,367,618

CONTROL VALVE DEVICE

John W. Rush, Wilkinsburg, Pa., assignor to The Westinghouse Air Brake Company, Wilmerding, Pa., a corporation of Pennsylvania Application September 29, 1943, Serial No. 504,255

4 Claims. (Cl. 303—14)

This invention relates to fluid pressure brake equipment for railway locomotives and more particularly to locomotive brake equipment of the type disclosed in the patent to E. E. Hewitt et al. No. 2,173,940, issued September 26, 1939.

While locomotives equipped with brake equipment of the type disclosed in the aforementioned patent entirely meets the braking requirements of the various railroads when run as a live engine it has been found that under certain conditions when locomotives so equipped are hauled as a dead engine in a train, the main reservoir pressure on the locomotive may unintentionally be vented. The unintentional venting of fluid under pressure from the main reservoir on locomotives hauled dead in a train is undesirable and may result not only in a brake failure on the dead locomotive but in a brake failure throughout the train for the reason that the main reservoir on the dead locomotive is connected to the train brake pipe and venting of the main reservoir pressure on the dead locomotive results in venting of brake pipe pressure throughout the train.

The principal object of the invention is to provide a brake equipment of the type disclosed in the aforementioned patent having means for positively eliminating the above mentioned undesirable feature.

Other objects and advantages will appear in the following more detailed description of the invention.

In the accompanying drawings,

Fig. 1 is a diagrammatic view, partly in section, of a locomotive brake equipment embodying the invention.

Fig. 2 is an enlarged view, partly in section of the independent brake valve device shown in Fig. 1.

Fig. 3 is an enlarged sectional view of the interlock portion of the control valve device shown in Fig. 1 of the drawings.

As shown in Fig. 1 of the drawings, the locomotive brake equipment comprises a combined automatic and straight air brake valve device 1, an independent brake valve device 2, a master switch device 3 and an application and a release magnet valve device 4 controlled by said switch, a control valve device 5, a relay valve device 6, a double heading cock 7 and in addition the usual dead engine apparatus comprising a cutout cock 8 and a combined air strainer and check valve 9. The equipment further comprises a straight air pipe 10 and a brake pipe 11 both of which are adapted to extend continuously throughout the length of the locomotive or train, application and release wires 12 and 13, respectively, a main reservoir 14 adapted to be supplied with fluid under pressure in any well known manner, a feed valve device 15 operative to supply fluid under pressure from said reservoir to a feed valve pipe 16 at a pressure which it is desired to be carried in the brake pipe 11, and a brake cylinder 18 for applying the brakes on the locomotive.

It will be understood that the equipment shown in Fig. 1 of the drawings is essentially the same as the equipment disclosed in the aforementioned patent, and that with the exception of the interlock portion of the control valve device 5 shown in section in Fig. 3 of the drawings and hereinafter described in detail, the parts of the equipment shown in Fig. 1 may be identical in construction and will operate in the same manner as the corresponding parts of the equipment disclosed in the aforementioned patent. However, in the present application only those parts of the equipment are shown which are deemed essential to a clear unstanding of the invention.

Briefly described, the combined automatic and straight air brake valve device 1 is provided with means for controlling the brakes on the locomotive and cars of a train by straight air through the straight air pipe 10, and other means for controlling the locomotive and car brakes on the automatic principle through the medium of the brake pipe 11, and is also provided with a selector 19 for selecting either the straight air or automatic control of the locomotive and train brakes.

The independent brake valve device 2 is provided for controlling the brakes on the locomotive independently of the brakes on the cars in the train. This brake valve device is provided with means for controlling the operation of a self-lapping application and release valve mechanism, a cutoff valve, an application delay valve, and a lockout valve mechanism 20. Since a detailed description of the application and release valve mechanism, the cutoff valve and the application delay valve is not essential to a clear understanding of the invention they have been omitted.

Briefly described the lockout valve mechanism 20, as clearly shown in Fig. 2, comprises two oppositely seating valves 21 and 22 which are disposed in chambers 23 and 24, respectively, and provided with oppositely extending fluted stems, which engage each other in end to end relationship within an intermediate chamber 25. The chamber 23 is connected to the main reservoir 14 by way of a passage 26, a branch pipe 27 and a main reservoir pipe 28. The chamber 24 is open to the atmosphere through a passage 30, and the intermediate chamber 25 is connected, by way of a passage 34, to a pipe 32 leading to the interlock portion of the control valve device 5.

The brake valve casing is provided with a vertical bore in axial alignment with the valve 22 and is open at one end to chamber 24 and at the opposite end to the exterior of the brake valve casing. Slidably mounted in said bore is a plunger 35, which is carried by a spring 36 supported on the valve 22. A spring 37 disposed in chamber 23 acts on the valve 21 for normally urging it to its seated position and for unseating the valve 22, as shown, and is of sufficient strength to normally support the plunger 35 in the position shown.

Interposed between the brake valve handle and the upper end of the plunger 35 is bail 38 which is adapted to be moved downwardly by the handle into engagement with the upper end of the plunger 35. Continued downward movement of the handle acting through the medium of bail 38, plunger 35 and spring 36 effects seating of the valve 22 and unseating of the valve 21 against the opposing pressure of spring 37. The release of manual pressure on the handle permits operation of spring 37 to seat valve 21 and unseat the valve 22, all of which is fully described in the aforementioned patent.

The master switch device 3, which is provided for controlling the energization and deenergization of the application and release train wires 12 and 13 when straight air is used to control the brakes comprises a diaphragm assemblage subject to the opposing pressures of fluid in the straight air pipe 10 and a pipe 40, the pipe 40 being supplied with fluid under pressure from either a service control pipe 41 or an emergency control pipe 42.

The application and release magnet valve device 4 comprises an application magnet 43 having one terminal connected to the application wire 12 and the other to the ground, and also comprises a release magnet 44 having one terminal connected to the release train wire 13 and the other to the ground.

The application magnet 43 is provided for unseating an application valve upon energization of the magnet so as to supply fluid under pressure from a pipe 45, which is connected to the auxiliary reservoir 46, to a branch pipe 47 which is in open communication with the straight air pipe 11. Upon deenergization of the magnet 43 a spring which acts on the valve seats same and cuts off the supply of fluid under pressure to the straight air pipe.

The release magnet 44 is provided for seating a release valve upon energization of the magnet so as to close communication between the straight air branch pipe 47 and an atmospheric release port. Upon deenergization of the magnet 44, a spring, which acts on the valve, unseats the valve to open the release communication.

The relay valve device 6 is of the type adapted to operate in response to pressure of fluid supplied thereto through a pipe 49, which is in open communication with a brake application and release passage 50 in the control valve device 5, to supply fluid under pressure by way of pipe 28, from the main reservoir 14 to the brake cylinder 18 for applying the brakes on the locomotive. Upon release of fluid under pressure from pipe 49, the relay valve device 6 is adapted to operate to release fluid under pressure from the brake cylinder. In other words, the relay valve device 6 is operative to vary the pressure in the brake cylinder in accordance with variations in the pilot or control pressure in pipe 49 in the usual manner.

The control valve device 5 comprises a service valve portion 55, an emergency valve portion 56, an interlock portion 57, a pipe bracket 58 and a filling piece 59. This control valve device, except for the interlock portion 57, as hereinbefore mentioned, is the same or similar in function and construction to the control valve device disclosed in the aforementioned patent. Since a detailed description of the intricate construction and operation of the service and emergency portion of the control valve device is not essential to a clear understanding of the invention it is not deemed essential to show and describe these parts in detail.

The interlock portion 57 which is employed to interlock the automatic and straight air controls of the brake system for the locomotive and cars of a train and the independent control of the brake system on the locomotive, comprises two double check valves 60 and 61 of the usual construction, a selector valve device 62 and an independent release valve 63.

The double check valve 60 is in the form of a movable piston arranged to control communication between the brake application and release passage 50 and either a passage 66 open to one end of said check valve, or a passage 67 open at the opposite end. In the position shown in the drawings the passage 50 is disconnected from passage 67 and connected to passage 66. Upon movement of the check valve 60 to its upper position passage 50 is disconnected from passage 66 and connected to passage 67.

The double check valve device 61 is like check valve 60 and is provided to control communication between passage 66 and either a straight air passage 69 at one end of the device or an independent application and release control passage 70 at the opposite end of the device.

The independent release valve 63 is provided for controlling communication between passage 50 and a local atmosphere vent passage 71 and is provided on one side with a gasket adapted to engage a seat rib 72 for closing said communication, and has at the opposite side a chamber 73 connected to a passage 74 and containing a spring 75 for urging the valve to its closed position as shown in the drawings.

A check valve 76 is disposed in passage 74 to prevent back flow of fluid under pressure in the direction from selector valve 62 to the chamber 73. A restricted port 77 is provided through the independent release valve 63, which port connects chamber 73 to passage 50 for permitting equalization of the fluid pressures acting on the opposite sides of said valve so that the spring 75 will be enabled to hold the valve 63 in the position closing communication between passage 50 and the vent port 71.

The parts of the interlock portion 57 so far described are identical with the corresponding parts of the interlock portion shown and described in the aforementioned patent. However, according to the invention, the interlock portion 57 has been provided with an improved selector valve device 62.

This improved selecetor valve device 62 is provided with a piston bore 80 containing a piston 81. At one side of the piston is a valve chamber 82 which is in permanent open communication with the main reservoir pipe 28, by way of a passage 83. The piston 81 is provided for controlling movement of a slide valve 84 disposed in chamber 82 and operatively connected to said piston by means of a piston stem 85.

The piston bore 80 is closed at one end by a housing 86 which is secured to the selector valve casing in any suitable manner, a sealing gasket 87 being interposed between said housing and said casing.

Contained in housing 86 is a piston 88. At the outer face of this piston there is a chamber 89 which is in constant open communication, by way of a passage 90, with the pipe 34 leading to the independent brake valve device 2. The inner face of piston 88 is provided with a pair of spaced annular seat ribs 91 and 92 which are adapted to engage a sealing gasket 93 provided in a chamber 94 at this inner face side of the piston, which gasket is carried by the wall 95 of the housing 86. The piston 88 is provided with a stem 96 which is slidably guided in the wall 97 of said housing and which, at its outer end, engages the outer face of the selector piston 81.

The positioning of the piston 88 and thereby the positioning of the piston 81 and connected slide valve 84 is controlled by the lockout valve mechanism in the independent brake valve device 2. When the independent brake valve handle is in its normal raised position as shown in Fig. 2, the chamber 89 at the outer face of piston 88 is vented through passage 90, pipe 32, passage 34 in the brake valve device, chamber 25, past unseated lockout valve 22, chamber 24 and passage 30, thus permitting fluid at main reservoir pressure in valve chamber 82 to hold the selector piston 81, slide valve and piston 88 in the position in which they are shown in the drawings. When the handle of the independent brake valve device 2 is depressed, the valve 22 is seated and the lockout valve 21 is open and permits fluid under pressure to flow from the main reservoir branch passage 26 and pipe 27 to the piston chamber 89 by way of passage 34, pipe 32 and passage 90.

It will be noted that the piston 88 is of greater area than piston 81, so that the fluid at main reservoir pressure supplied to chamber 89 will cause the piston 88 and its stem 96 to move upwardly from the position in which they are shown until brought to a stop by the annular seat ribs 91 and 92 engaging the gasket 93. The piston 88 as it thus moves acts through the medium of stem 96 to cause the piston 81 and attached slide valve 84 to move in the same direction to the independent control position, against the opposing main reservoir pressure acting in chamber 82 on the smaller piston 81. With the annular seat ribs 91 and 92 in sealing engagement with the gasket 93 the space between the ribs will be connected to the atmosphere through a passage 100.

When the locomotive is run as a live engine, the handle of the cutout cock 9 is rotated to the position in which communication between the brake pipe 11 and the main reservoir pipe 28 is cut off and the equipment will operate in identically the same manner as fully described in the aforementioned patent to control the brakes on the locomotive and the cars of the train.

If further information as to the function of the equipment when the locomotive is run as a live engine is desired, reference may be had to the prior, hereinbefore mentioned patent to E. E. Hewitt et al.

When a locomotive provided with this equipment is hauled dead in a train, it is desirable to condition the brake valve device 1 and master switch 3 so that the neither can be operated unintentionally or otherwise interfere with the usual service control of the brakes on the train from the locomotive in control. In order to accomplish this the valve 101 of the double heading cock 7 is turned from the position in which it is shown in Fig. 1 of the drawings to a position in which both the brake pipe 11 and the service control pipe 41 are cut off from the brake valve device 1 so that the brake valve device has no control over a service application of the brakes effected through the straight air pipe 10 or the brake pipe 11, nor over a subsequent release of such an application.

It will be understood that the handle of the brake valve device 1 will be maintained or carried in its running position and that the handle of the independent brake valve device 2 will be carried or maintained in its normally raised position. With the independent brake valve handle in its normal raised position as shown in Fig. 3, the lockout valves 21 and 22 therein will be positioned as shown in this figure and chamber 89 in the selector valve 62 of the control valve device 5 will be vented by way of passage 90, pipe 32, passage 34 in the independent brake valve device 2, chamber 25, past unseated valve 22, chamber 24 and passage 30.

Since the locomotive is being hauled dead in the train the compressor on the dead locomotive will of course be inoperative and the air for operating the brakes on such a locomotive must then be supplied through the brake pipe from the locomotive in control of the train. In order to charge the main reservoir on the dead locomotive, the cutout cock 8 on such locomotive is turned from its normal position in which communication between the brake pipe 11 and the main reservoir pipe 28 is cut off to a position in which communication between said pipes is established. With communication between said pipes thus established, fluid under pressure flows from brake pipe 11 to the main reservoir pipe 28 and thereby to the main reservoir 14, through cutout cock 8 past a check valve and through a restricted port (not shown) in the combined strainer and check valve device 9.

Fluid at brake pipe pressure thus supplied to the main reservoir pipe 28 flows therefrom by way of passage 83, extending through the pipe bracket 58 and filling piece 59, to chamber 82 in the selector valve device 62. Now since the chamber 89 of the selector valve device is vented to the atmosphere by way of the independent brake valve device 2 an increase in the pressure of fluid in chamber 82, sufficient to overcome the friction of piston 81, slide valve 84 and piston 88, will cause said pistons and slide valve 84 to move downwardly to the position in which they are shown in Fig. 3 of the drawings. With the selector piston 81 in the position shown it will be in sealing engagement with the gasket 87.

From the foregoing description it will be apparent that when the pistons 81 and 88 are in the position in which they are shown in Fig. 3, the seal between the face of the piston 81 and the gasket 87 will prevent any material flow of fluid from the chamber 82. It will also be apparent that when the pistons are in their other or upper position the sealing rib 92 will prevent any material flow of fluid from chamber 82. When the pistons are in this upper position the sealing rib 91 will prevent any material flow of fluid from chamber 89. It is therefore obvious that with the pistons in either of their control positions there cannot be a continuous flow of fluid under pressure from the chambers 82 and 89 to the atmosphere by way of passage 101, consequently there can be no loss of brake pipe or main reservoir pressure past the piston packing of the piston 81 nor can there be any loss of main reservoir pressure past the packing of piston 88.

The actuating piston in selector valve devices of the type disclosed in the aforementioned patent is normally held in sealing engagement with a gasket by reason of main reservoir pressure exceeding the opposing pressure of a spring. However, when a locomotive with this equipment is being hauled dead in a train the equipment is charged from the brake pipe to a lower pressure than is normally carried when the locomotive is live and at a restricted rate. At this time the rate of change is slow enough or else the pressure of fluid acting in the selector valve chamber is insufficient to move the actuating piston into sealing engagement with the gasket against the opposing pressure of the spring. As a result fluid under pressure which may leak from the chamber past the packing of the piston to the atmosphere by way of the actuating pipe and the independent brake valve device.

In the improved selector valve device there is no force other than friction opposing movement of the selector pistons 81 and 88 and the slide valve 84 so that a slight increase in pressure in chamber 82 will effect movement of piston 81 into sealing engagement with the gasket 87.

Having now described my invention, what I claim as new and desire to secure by Letters Patent is:

1. In a fluid pressure brake, in combination, a valve having a brake application position and a brake release position, a main reservoir, a first chamber constantly connected to said main reservoir, a second chamber, a passage leading from said second chamber to the atmosphere, a third chamber at one time supplied with fluid under pressure and at another time vented to the atmosphere, a first piston having one face subject to the pressure of fluid in said first chamber, a second piston subject on one side to the pressure of fluid in said third chamber and operative when said third chamber is supplied with fluid under pressure to actuate said first piston and thereby said valve to the brake release position, said first piston and thereby said valve being movable to the brake application position in response to the venting of fluid from said third chamber, means cooperating with said first piston to prevent the flow of fluid from said first chamber to said passage when said valve is actuated to its brake application position, and other means cooperating with said second piston to prevent the flow of fluid from said first chamber to said passage when said valve is actuated to its brake release position.

2. In a fluid pressure brake, in combination, a valve having a brake application position and a brake release position, a main reservoir, a first chamber constantly connected to said main reservoir, a second chamber, a passage leading from said second chamber to the atmosphere, a third chamber at one time supplied with fluid under pressure and at another time vented to the atmosphere, a first piston having one face subject to the pressure of fluid in said first chamber, a second piston subject on one side to the pressure of fluid in said third chamber and operative when said third chamber is supplied with fluid under pressure to actuate said first piston and thereby said valve to the brake release position, said first piston and thereby said valve being movable to the brake application position in response to the venting of fluid from said third chamber, a gasket having sealing engagement with said first piston to prevent the flow of fluid from said first chamber to said passage when said valve is actuated to its brake application position, and another gasket having sealing engagement with said second piston to prevent the flow of fluid from said first chamber to said passage when said valve is actuated to its brake release position.

3. In a fluid pressure brake, in combination, a valve having a brake application position and a brake release position, a main reservoir, a first chamber constantly connected to said main reservoir, a second chamber, a passage leading from said second chamber to the atmosphere, a third chamber at one time supplied with fluid under pressure and at another time vented to the atmosphere, a first piston having one face subject to the pressure of fluid in said first chamber, a second piston subject on one side to the pressure of fluid in said third chamber and operative when said third chamber is supplied with fluid under pressure to actuate said first piston and thereby said valve to the brake release position, said first piston and thereby said valve being movable to the brake application position in response to the venting of fluid from said third chamber, and sealing means cooperating with said pistons to prevent the flow of fluid from said first chamber to said passage when said valve is actuated to its brake application position and to prevent the flow of fluid from said first chamber and said third chamber to said passage when said valve is actuated to its brake release position.

4. In a fluid pressure brake, in combination, a valve having a brake application position and a brake release position, a main reservoir, a first chamber constantly connected to said main reservoir, a second chamber, a passage leading from said second chamber to the atmosphere, a third chamber at one time supplied with fluid under pressure and at another time vented to the atmosphere, a first piston having one face subject to the pressure of fluid in said first chamber, a second piston subject on one side to the pressure of fluid in said third chamber and operative when said third chamber is supplied with fluid under pressure to actuate said first piston and thereby said valve to the brake release position, said first piston and thereby said valve being movable to the brake application position in response to the venting of fluid from said third chamber, a gasket, a pair of annular seat ribs carried by said second piston, and movable into sealing engagement with said gasket to prevent flow of fluid from said first chamber and said third chamber to said pasage when said valve is actuated to its brake release position, and another gasket adapted to be engaged by said first piston when said valve is actuated to its brake application position to prevent flow of fluid from said first chamber to said passage.

JOHN W. RUSH.